United States Patent
Pedersen (10) Patent No.: US 10,447,114 B2
(45) Date of Patent: Oct. 15, 2019

(54) CHOKE FOR INTERLEAVED SWITCHING

(71) Applicant: VESTAS WIND SYSTEMS A/S, Aarhus N (DK)

(72) Inventor: Tune Pedersen, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 23 days.

(21) Appl. No.: 15/510,690

(22) PCT Filed: Sep. 3, 2015

(86) PCT No.: PCT/DK2015/050262
§ 371 (c)(1),
(2) Date: Mar. 12, 2017

(87) PCT Pub. No.: WO2016/037623
PCT Pub. Date: Mar. 17, 2016

(65) Prior Publication Data
US 2017/0229937 A1    Aug. 10, 2017

Related U.S. Application Data

(60) Provisional application No. 62/049,689, filed on Sep. 12, 2014.

(51) Int. Cl.
*H02K 7/18* (2006.01)
*H02M 7/493* (2007.01)
(Continued)

(52) U.S. Cl.
CPC .............. *H02K 7/183* (2013.01); *H01F 27/28* (2013.01); *H01F 38/00* (2013.01); *H02M 5/458* (2013.01); *H02M 7/493* (2013.01)

(58) Field of Classification Search
CPC .............. H02M 3/1584; H02M 3/285; H02M 3/33507; H02M 3/33523; H02M 5/458;
(Continued)

(56) References Cited

U.S. PATENT DOCUMENTS 1,872,009 A * 8/1932 Robinson .............. H02M 7/068
315/140
2,892,142 A * 6/1959 Genuit .................. H01F 38/04
363/12
(Continued)

FOREIGN PATENT DOCUMENTS

DE         102007063434 A1    1/2009
EP             2141790 A2     1/2010
(Continued)

OTHER PUBLICATIONS

Danish Search Report for PA 2014 70608, dated Jun. 3, 2015.
International Search Report for PCT/DK2015/050262, dated Nov. 5, 2015.

*Primary Examiner* — Yemane Mehari
(74) *Attorney, Agent, or Firm* — Patterson + Sheridan, LLP (57) ABSTRACT

When performing interleaved switching, a power generation system may include chokes for filtering out a high-frequency ripple. However, because the chokes are interconnected, a common mode current can flow between the different parallel converters. Instead of connecting all the outputs of a parallel converter to the same choke, the same phase of each of the parallel converters is sent to one of the chokes. For example, the first phase signals are sent to a first choke, the second phase signals are sent to a second choke, and so forth. By doing so, air gaps in the chokes can be manipulated in order to provide a different inductance for the common mode current than a grid current. For example, the air gaps may be arranged such that the inductance corresponding to the common mode current is greater than the inductance corresponding to the grid current.

15 Claims, 10 Drawing Sheets

(51) Int. Cl.
*H01F 27/28* (2006.01)
*H01F 38/00* (2006.01)
*H02M 5/458* (2006.01)

(58) Field of Classification Search
CPC ... H02M 2001/0032; H02M 2001/007; H02M 1/32; H02M 7/493; H02J 1/102; Y02B 70/126; Y02B 70/1441; H02K 7/183; H01F 27/28; H01F 38/00
USPC .............. 363/34, 36, 37, 65, 71, 95, 97, 131
See application file for complete search history.

(56) References Cited

U.S. PATENT DOCUMENTS

| | | | | |
|---|---|---|---|---|
| 5,852,554 | A * | 12/1998 | Yamamoto | H02M 7/493 363/71 |
| 5,956,244 | A | 9/1999 | Rehm et al. | |
| 6,891,736 | B2 * | 5/2005 | Takemura | H02M 3/1584 363/65 |
| 8,217,533 | B2 * | 7/2012 | Jones | H02J 3/01 307/82 |
| 8,653,931 | B2 * | 2/2014 | Xu | H02P 9/02 336/234 |
| 2002/0175571 | A1 | 11/2002 | Gilmore et al. | |
| 2005/0140347 | A1 * | 6/2005 | Chen | H02M 3/1584 323/282 |
| 2009/0261939 | A1 | 10/2009 | Shudarek | |
| 2014/0204630 | A1 | 7/2014 | Wagoner et al. | |
| 2015/0145462 | A1 * | 5/2015 | Ulrich | H02M 5/458 318/503 |
| 2018/0123496 | A1 * | 5/2018 | Ilic | H02P 27/08 |

FOREIGN PATENT DOCUMENTS

| | | |
|---|---|---|
| EP | 2448100 A2 | 5/2012 |
| EP | 2768129 A2 | 8/2014 |
| WO | 2008077203 | 7/2008 |

* cited by examiner

CHOKE FOR INTERLEAVED SWITCHING

BACKGROUND

Field of the Invention

Embodiments presented in this disclosure generally relate to generating electrical power. More specifically, embodiments disclosed herein reduce common mode current generated when using interleaved switching.

Description of the Related Art

In variable speed generators, a frequency converter is used to convert power from the generator at variable frequency to a predefined frequency corresponding to a load—e.g., a utility grid. In one example, the frequency converter converts the AC signal provided by the generator to a DC signal and then back to an AC signal with a frequency that matches the desired frequency of the load. To convert the DC signal to an AC signal with the desired frequency, the frequency converter may use pulse width modulation (PWM) based on a switching frequency. However, in frequency converters where the switching frequency is much higher than the frequency of the generator signal, PWM introduces a high-frequency ripple onto the desired AC signal which may require expensive (and bulky) filtering components to remove before the signal is suitable for a utility grid.

Performing interleaved PWM switching may be preferred since doing so reduces the high-frequency ripple, and thus, reduces the cost and size of the filtering components. However, even with interleaved switching, the frequency converter may output an AC signal with a high-frequency ripple, and thus, filtering components such as the choke may still be required. As such, there is need for additional techniques that can reduce the size and complexity of the filtering components which may reduce the cost of the power generation system.

SUMMARY

One embodiment of the present disclosure is a power generation system (e.g., a wind turbine) that includes a generator configured to output a multi-phase power signal and a power converter system comprising a plurality of parallel converter paths, each converter path is coupled to the generator to receive the multi-phase power signal. The power generation system includes at least one electrical choke including a plurality of windings. A first winding of the plurality of windings is coupled to a first output of a first path of the plurality of converter paths and a second winding of the plurality of windings is coupled to a first output of a second path of the plurality of converter paths. The first output of the first path and first output of the second path correspond to a same phase of the multi-phase power signal.

Another embodiment of the present disclosure is an electrical choke comprising a core that includes a top portion and a bottom portion both extending in a common direction, a first leg comprising a first end coupled to the top portion and a second end coupled to the bottom portion, and a second leg comprising a third end coupled to the top portion and a fourth end coupled to the bottom portion. The choke also includes a winding wrapping around a portion of the first leg. However, the second leg is not enclosed by any winding. The choke also includes a first air gap in the second leg, wherein a width of the first air gap is larger than a width of a second air gap in the core.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

As described above, performing PWM to convert a DC signal to an AC signal may generate a high-frequency ripple in the AC signal. For example, the desired signal may be a 50 or 60 Hz sine wave, but the ripple may be a much higher frequency signal (e.g., 4 kHz) that is introduced onto the sine wave. Interleaved switching (a type of PWM) mitigates this ripple but does not remove it. Moreover, during certain time intervals, interleaved switching generates a current (referred to herein as the "common mode current") that flows between two or more parallel frequency converters. The common mode current may stress the different components in the converters and waste power.

When performing interleaved PWM switching, a power generation system (e.g., a power plant such as a wind turbine) may include chokes for filtering out the ripple from the desired AC signal. To generate a multi-phase power signal, the power generation system includes a plurality of parallel converters and a plurality of corresponding chokes. The input of each of the chokes is connected to the different phases exiting a respective converter, while the outputs of the chokes are interconnected. Because the chokes are interconnected, the common mode current can flow between the different parallel converters through the chokes.

Instead of connecting all the outputs of one of the parallel converters to the same choke, the embodiments described herein connect one output from each of the parallel converters to the same choke. For example, assuming a three-phase power signal, instead of coupling the first, second, and third phase signals outputted by one of the parallel converters to the same choke, the first phase signals outputted by the parallel converters are sent to a first choke, the second phase signals outputted by the parallel converters are sent to a second choke, and the third phase signals outputted by the parallel converters are sent to a third choke. The outputs of the three chokes may then be interconnected. By attaching the chokes to converters in this manner, the air gaps in the chokes can be manipulated in order to provide a different inductance for the common mode current than a grid current (i.e., the current flowing from each of the converters to the load). In one embodiment, the air gaps are arranged such that the inductance corresponding to the common mode current is greater than the inductance corresponding to the grid current. In this manner, the chokes act as a current block to mitigate or reduce the common mode current flowing between the parallel converters.

Figure 1:
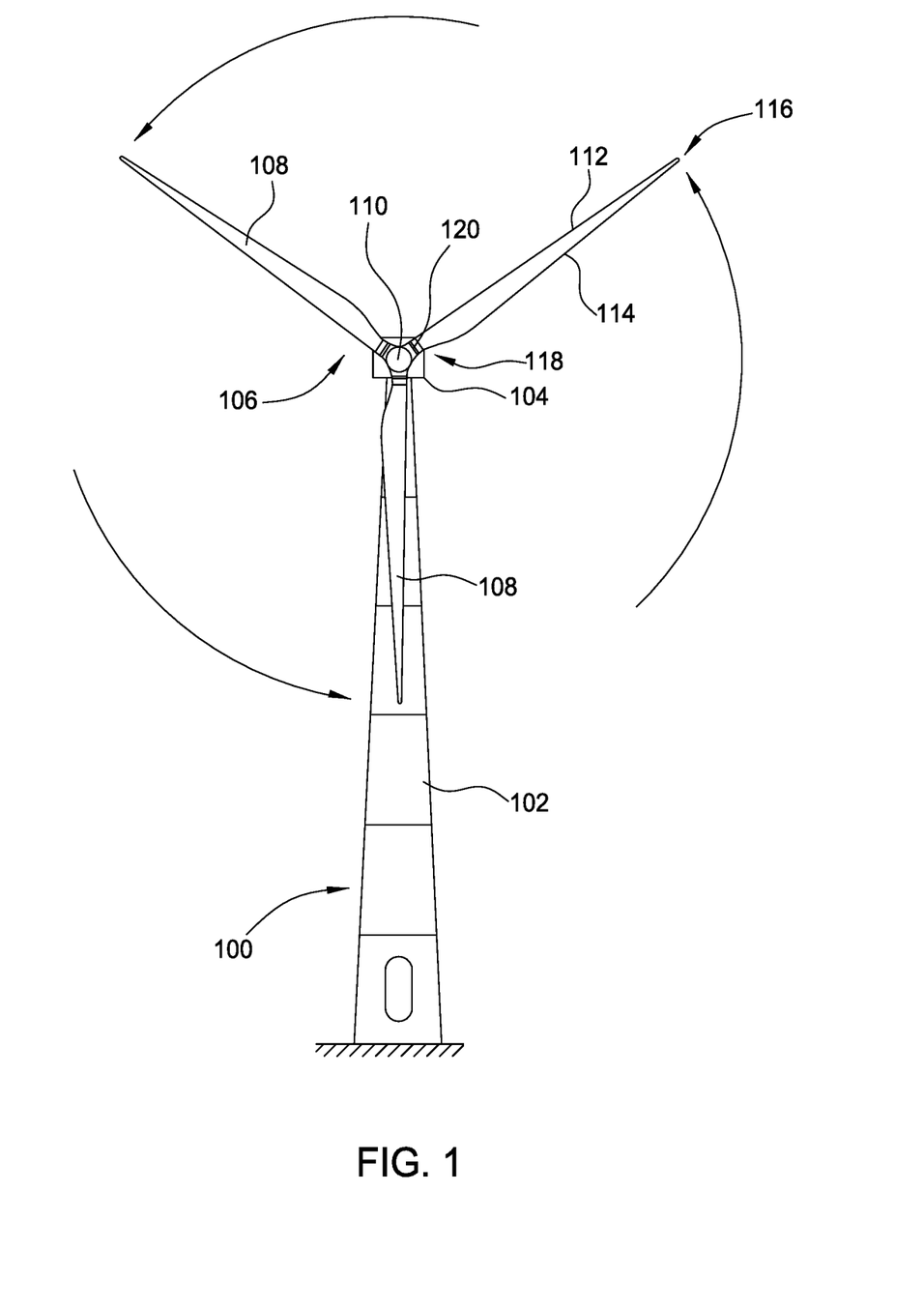
FIG. 1 illustrates a diagrammatic view of a wind turbine, according to one embodiment described herein.

FIG. 1 illustrates a diagrammatic view of a horizontal-axis wind turbine generator 100. The wind turbine generator 100 typically includes a tower 102 and a wind turbine nacelle 104 located at the top of the tower 102. A wind turbine rotor 106 may be connected with the nacelle 104 through a low speed shaft extending out of the nacelle 104. The wind turbine rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 may be controlled by linear actuators or stepper motors, for example, connected between the hub 110 and the blade 108. Blade pitch control may also be used among others systems to maximize the power generated below rated wind speeds and to reduce the power generated above the rated wind speed to prevent excessive loading on turbine components, e.g., the generator and gearbox. Although the following embodiments are described in the context of a wind turbine, the embodiments are not limited to such. Indeed, this disclosure may apply to any power generation system that experiences a common mode current flowing between parallel converters.

Figures 2, 3A:
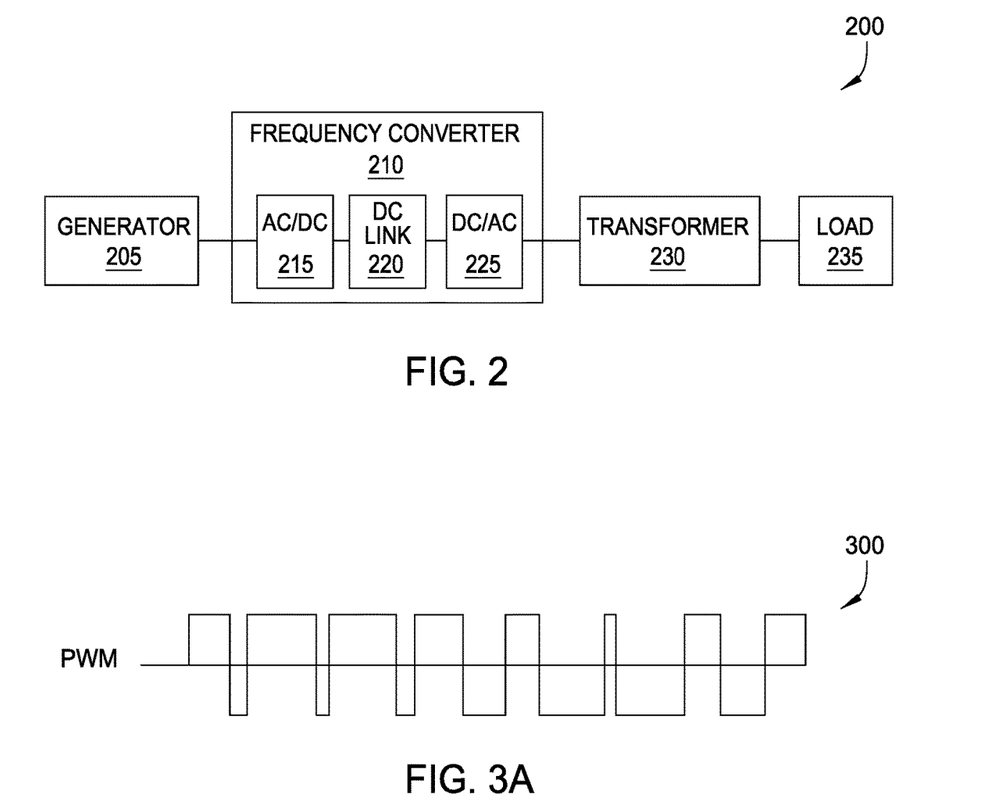
FIG. 2 illustrates a power generation system with a frequency converter, according to one embodiment described herein.
FIGS. 3A and 3B illustrate signals corresponding to PWM, according to one embodiment described herein.

FIG. 2 illustrates a power generation system 200, according to one embodiment described herein. The system 200 includes a generator 205, frequency converter 210, transformer 230, and load 235. Generally, generator 205 converts a mechanical force (e.g., wind, steam, etc.) into electrical power. In one embodiment, the generator 205 may be a variable speed generator, and as such, the electrical power signal produced by the generator 205 may have a varying frequency. For example, the AC power signal may range from 50 Hz to 150 Hz. Because the load 235 may demand a power signal at a predefined frequency (e.g., 50 Hz or 60 Hz), the frequency converter 210 (also referred to as a power converter) converts the output of the generator 210 to an AC power signal at the desired frequency. To do so, the converter 210 includes an AC/DC converter 215 that changes the AC power signal from the generator 205 into a DC signal, a DC link or bus 220 that transfers the DC signal, and a DC/AC converter 225 that converts the DC signal back into a AC signal that has the frequency desired by the load 235. The AC signal is then sent to a transformer 230 which adjusts the current and voltage before transmitting the AC signal to the load 235—e.g., a utility grid forming a consumer power network.

In one embodiment, generator 205 outputs a multi-phase power signal. A three-phase signal is typical, but this disclosure may be used in any multi-phase system. The frequency converter 210 may include multiple parallel converter paths for converting the multi-phase power signal to the desired frequency. For instance, if the generator 205 outputs a three-phase signal, the converter 210 may include a plurality of parallel converter paths that each includes a respective AC/DC converter 210, DC link 220, and DC/AC converter 225. For example, the converter 210 may include three or four parallel converter paths for converting the three-phase signal into the desired frequency. As such, each of the parallel converter paths is referred to herein as a "parallel converter." For example, frequency converter 210 may include three parallel converters.

Figure 3B:
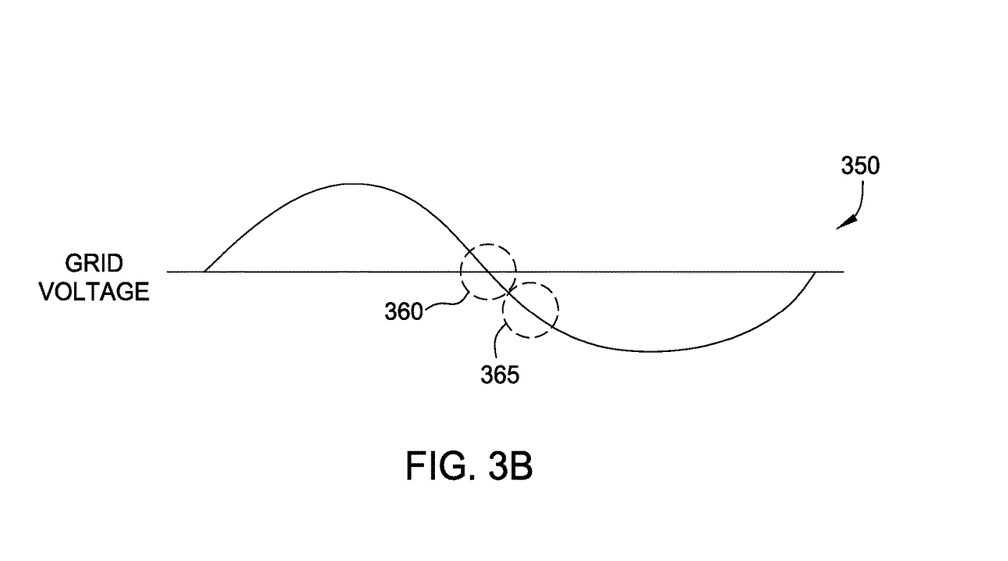

FIGS. 3A and 3B illustrate signals corresponding to PWM, according to one embodiment described herein. Specifically, chart 300 in FIG. 3A illustrates using PWM to generate an AC signal from a DC signal. To do so, the PWM signal shown in chart 300 (e.g., a 3-4 kHz signal) may be used as a control signal for the DC/AC converter 225 shown in FIG. 2. By controlling power switches in the converter 225 using the PWM signal, the output voltage of the converter 225 is driven either up or down. More specifically, changing the duty cycle of the PWM signal determines whether the output voltage of the converter 225 increases or decreases. FIG. 3B illustrates the output voltage of converter 225 based on applying the PWM signal in FIG. 3A to the DC/AC converter 225. Chart 350 illustrates a resulting AC sine wave (after using a low pass filter to smooth the signal) that then may be provided to the load or grid. As can be seen by comparing the duty cycle shown in chart 300 to the change in voltage shown in chart 350, increasing the duty cycle of the PWM signal increase the output voltage of the DC/AC converter 225, while decreasing the duty cycle decreases the output voltage. In this manner, the duty cycle of a high-frequency signal can be used to generate a low-frequency AC signal.

Figure 4:
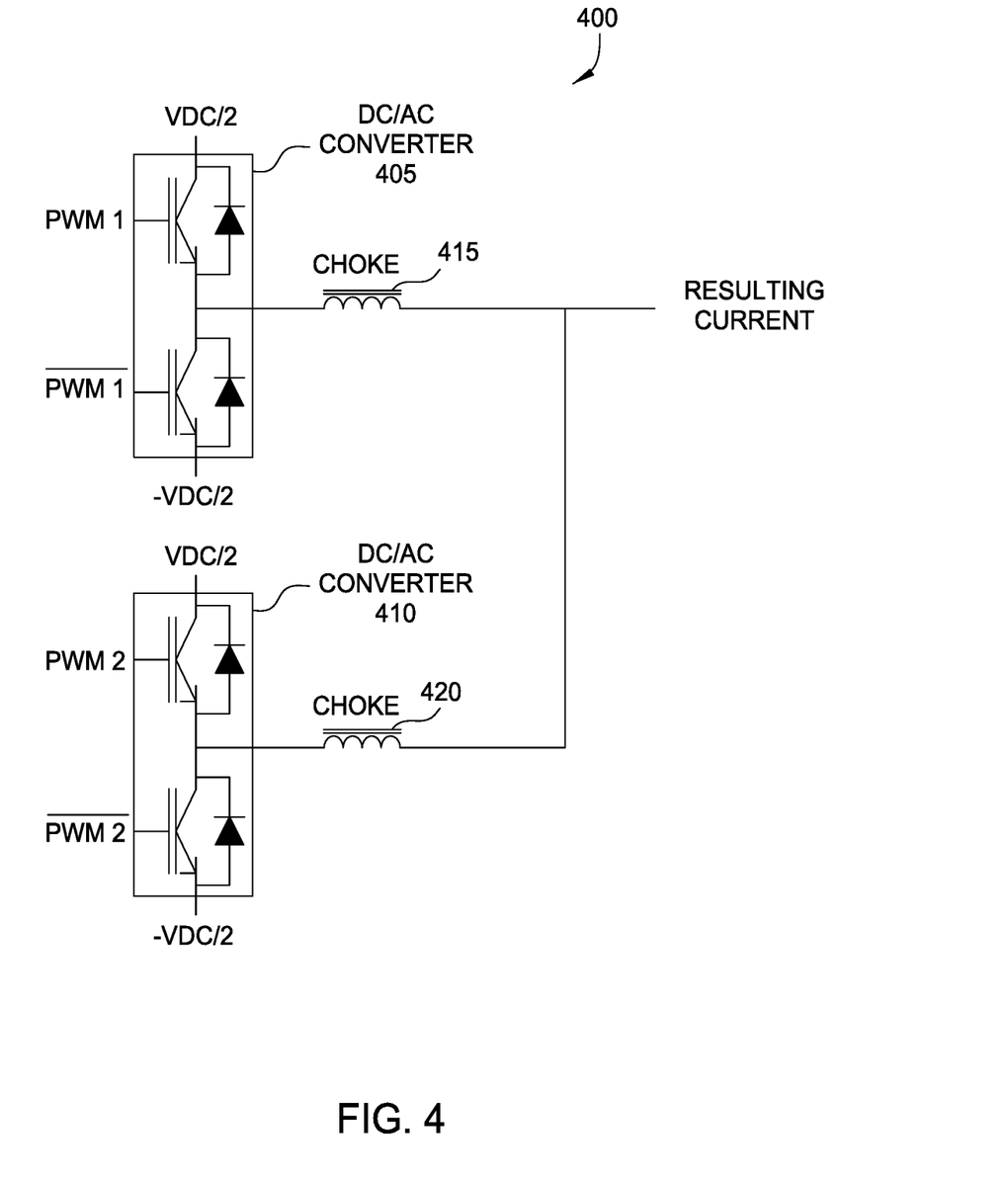
FIG. 4 illustrates a frequency converter performing interleaved PWM, according to one embodiment described herein.

FIG. 4 illustrates one phase of two parallel converters performing interleaved PWM, according to one embodiment described herein. Specifically, the system 400 illustrates a portion of a frequency converter (e.g., converter 210 in FIG. 2) that includes DC/AC converters 405 and 410 in two parallel converter paths. For simplicity, the AC/DC converters and DC links of the two parallel converter paths are not shown.

DC/AC converter 405 includes two switches (e.g., power transistors) where the gate of the switch coupled to the positive voltage rail VDC/2 (i.e., the positive voltage of the DC link) is controlled by PWM 1 and the gate of the switch coupled to the negative voltage rail −VDC/2 (i.e., the negative voltage of the DC link) is controlled by the inverse of PWM 1 (PWM 1 bar). As such, when PWM 1 is high, the upper switch is open and the output voltage of converter 405 is driven up to VDC/2 while the lower switch is closed. However, when PWM 1 bar is high, the lower switch is open and the output voltage of converter 405 is driven down to −VDC/2, while the upper switch is closed.

DC/AC converter 410 functions in a similar manner. That is, the converter 410 relies on the PWM 2 signal and its inverse PWM 2 bar to drive the output voltage between VDC/2 and −VDC/2 which are provided by the DC link. As such, FIG. 4 illustrates a simplified converter 400 that includes two parallel converter paths for converting the frequency of a single-phase power signal.

Figure 5A:
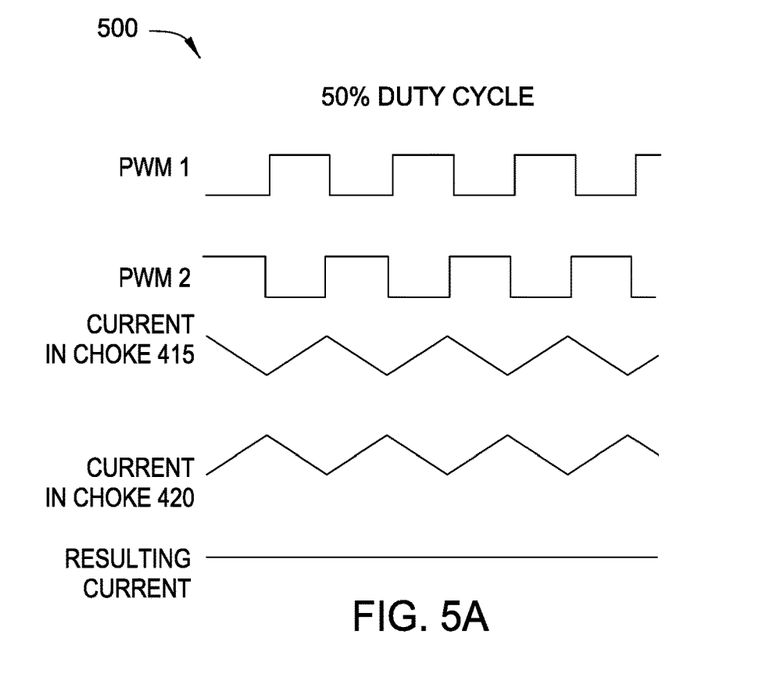
FIGS. 5A and 5B are timing charts for performing interleaved PWM, according to one embodiment described herein.

FIGS. 5A and 5B are timing charts for performing interleaved PWM, according to one embodiment described herein. Specifically, FIG. 5A illustrates the signals at a 50% duty cycle. Referring back to chart 300 and 350 in FIGS. 3A and 3B, when driving a 50% duty cycle, the voltage of the resulting sine wave is approximately at a reference, or neutral, voltage. As illustrated in chart 500, PWM 1 is the inverse of PWM 2 (i.e., phase shifted by 180 degrees). As a result, the current through choke 415 is the opposite of the current in choke 420. When the output currents of the chokes are combined, the resulting current shown in chart 500 is a current with very little or no ripple.

Although the resulting current in chart 500 is shown as a DC signal, this current is a zoomed in portion of the sine wave shown in FIG. 3B—e.g., portion 360 of the sine wave. As shown in chart 500 this portion 360 of the sine wave does not include a high-frequency ripple (e.g., a ripple around the frequency of the PWM switching). Stated generally, when performing interleaved switching with a 50% duty cycle when the PWM 1 and 2 signals are phase shifted by 180 degrees, the high-frequency ripple on the 50 Hz or 60 Hz power signal is greatly reduced or even eliminated.

Figure 5B:
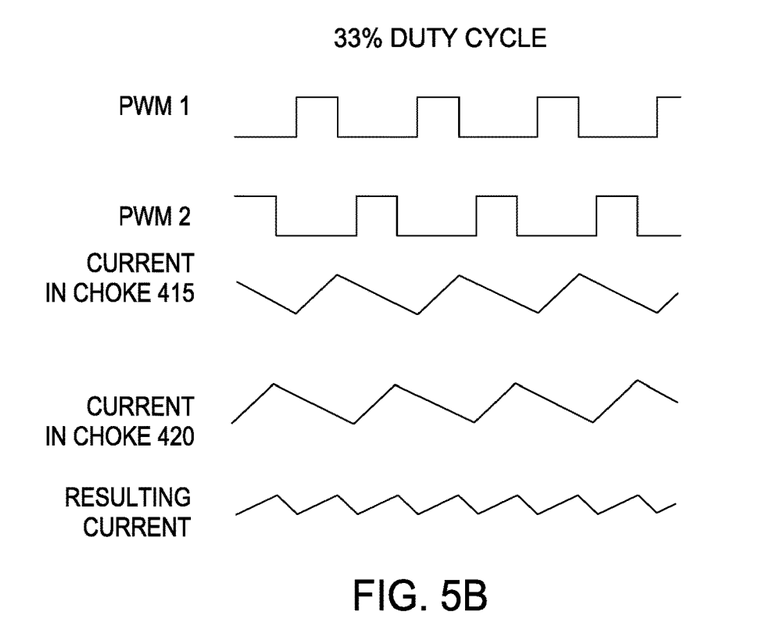

In contrast, chart 550 illustrates that when driving PWM 1 and PWM 2 with a 33% duty cycle there remains a high-frequency ripple. Because PWM 1 and PWM 2 are phase shifted by 180 degrees (i.e., interleaved by 180 degrees), when driving the signals with a 33% duty cycle, the output currents in choke 415 and choke 420 are not opposite signals. For example, at certain periods, the current in both chokes 415, 420 is increasing or decreasing. Thus, when the output currents are combined, the resulting current includes a high-frequency ripple caused by the interleaved PWM. Referring back to FIG. 3B, this high-frequency ripple may be introduced onto the low-frequency sine wave at the portion 365 when the duty cycle is approximately 33%. Thus, FIGS. 5A and 5B illustrate that although interleaved switching may mitigate the high-frequency ripple, this technique may not eliminate it.

Figure 6:
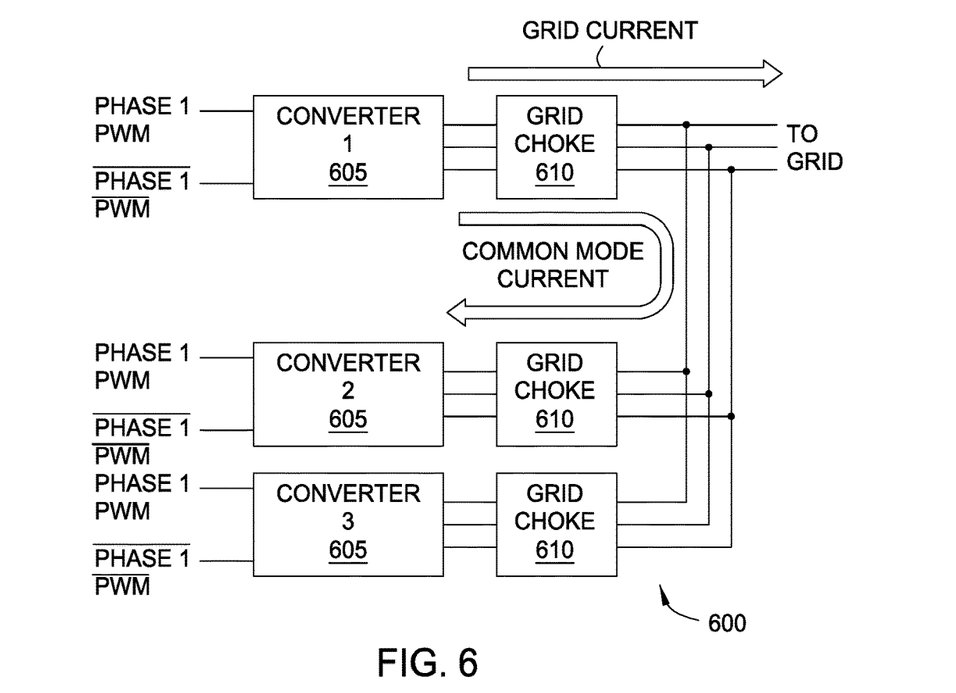
FIG. 6 illustrates parallel DC/AC converters for a three-phase power signal, according to one embodiment described herein.

FIG. 6 illustrates parallel DC/AC converters for a three-phase power signal, according to one embodiment described herein. Unlike FIG. 4 which illustrates parallel converters for a single phase, the conversion system 600 includes three DC/AC converters 605 (Converters 1, 2, and 3) that each output three different voltage signals—one for each phase. Additionally, the system 600 includes a plurality of grid chokes 610 that is used to reduce the ripple introduced by PWM. To output three different voltage signals, each converter 605 includes inputs signals corresponding to each phase. Although FIG. 6 illustrates only the Phase 1 PWM control signal (and its inverse), the converters 605 also receive Phase 2 and 3 PWM control signals (and their inverses) to output voltages for these phases as well.

Using the PWM control signals for the three phases, the converters 605 each output three voltage signals into the grid chokes 610. For example, the system 600 may include a respective grid choke 610 for each of the three converters 605. The grid chokes have three inputs which correspond to the three outputs of one of the converters 605 (i.e., the output voltage of phase 1, the output voltage of phase 2, and the output voltage of phase 3). The outputs of the chokes 610 are then combined such that phase 1 outputs of the chokes are all interconnected, the phase 2 outputs are all interconnected, and so forth. These three phases are then transmitted to the grid. In other embodiments, instead of a unitary grid choke 610, each of the phases may be sent to individual grid chokes—i.e., each converter 605 is associated with three individual chokes. Regardless of the number of chokes 610, the system 600 uses the chokes 610 to combine the output voltages of the converters 605 into a three-phase power signal. As shown here, the resulting current that flows from the converters 605, through one of the chokes 610, and to the grid is referred to as the "grid current."

Figure 7:
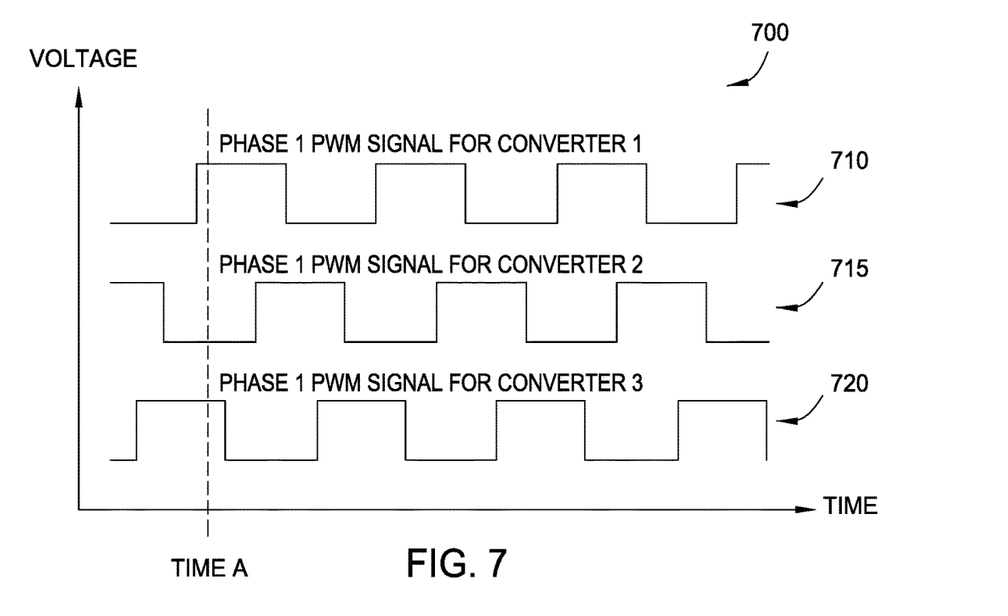
FIG. 7 is a timing chart for performing interleaving PWM switching for the first phase of the three-phase power signal, according to one embodiment described herein.

FIG. 7 is a timing chart 700 for performing interleaving PWM switching for the first phase of the three-phase power signal, according to one embodiment described herein. Because power system 600 performs interleaved PWM switching, the Phase 1 PWM signals for each of the Converters 1, 2, and 3 are phase shifted relative to each other. For example, because the system 600 outputs a three-phase power signal, the Phase 1 PWM controls signals for each of the converters 605 is shifted by 120 degrees (the PWM controls signals for the other phases may be phase shifted in the same manner). As discussed above, interleaved switching may reduce the high-frequency ripple relative to performing PWM switching without interleaving.

However, phase shifting the PWM control signals for each of the phases may cause a common mode current (also referred to as a circular current) to flow between the converters 605. As shown in FIG. 6, the common mode current flows from Converter 1 and through its corresponding grid choke 610. However, instead of flowing to the grid, the common mode current flows through the middle grid choke 610 and into Converter 2. In some embodiments, the common mode current is undesired since this current may stress the power switches in the converters 605 and decrease the efficiency of the system 600.

The common mode current shown in FIG. 6 results from the Phase 1 PWM signals shown in chart 700 at Time A. During this time, the control signal for Converter 1 is high but the control signal for Converter 2 is low. That is, Converter 1 is driving the output voltage of Phase 1 to VDC/2 while Converter 2 is driving the output voltage of Phase 2 to −VDC/2. This voltage difference between the converters 605 causes the common mode current to flow from Converter 1 to Converter 2. Of course, since the control signal for Converter 3 is also high at Time A, additional common mode current may flow from Converter 3 to Converter 2. In some embodiments, the operator of the power generation system 600 may desire to eliminate or mitigate the common mode current resulting from performing interleaved switching.

Figure 8:
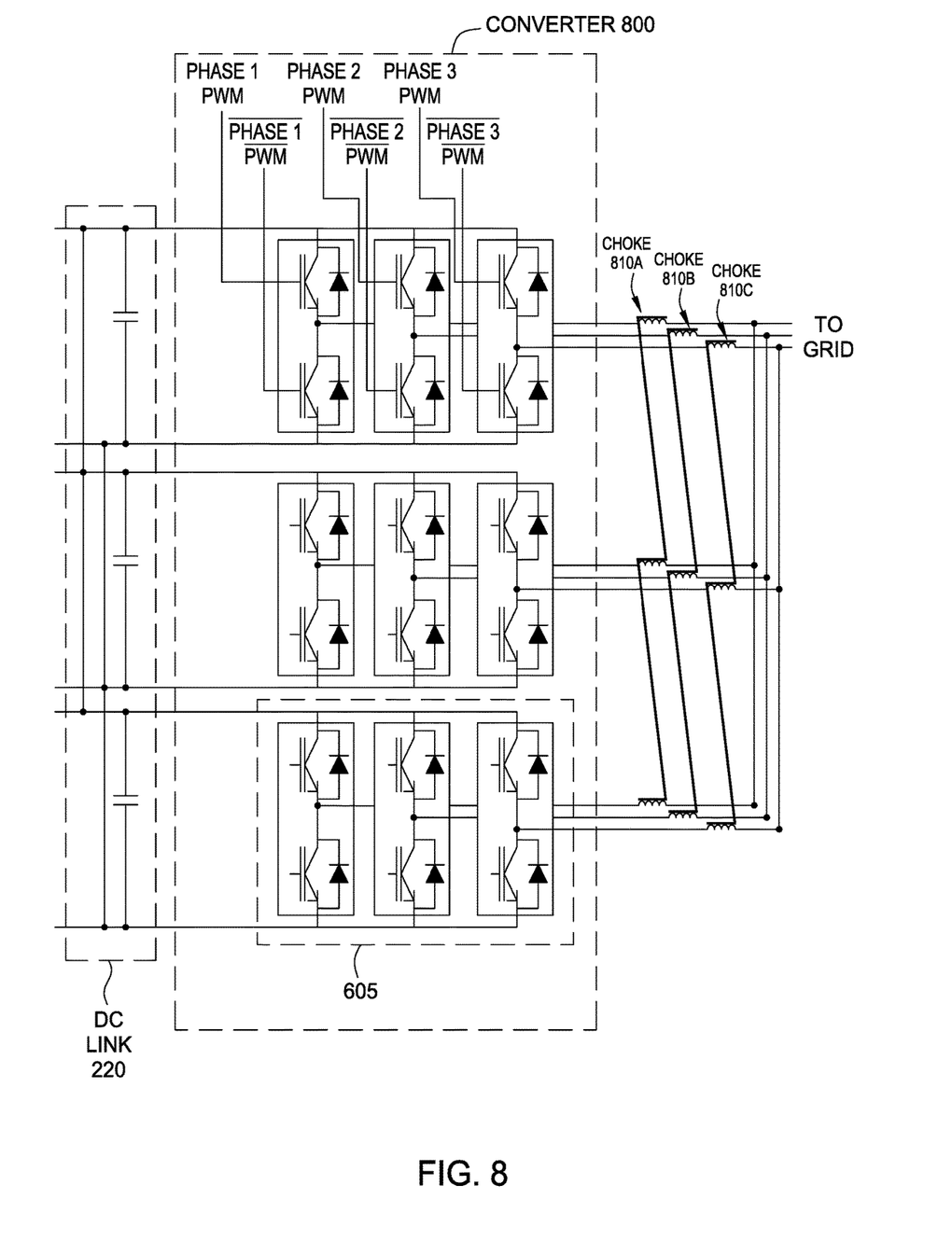
FIG. 8 illustrates parallel DC/AC converters for a three-phase power signal that reduces common mode current, according to one embodiment described herein.

FIG. 8 illustrates parallel DC/AC converters for a three-phase power signal with reduced common mode current, according to one embodiment described herein. Specifically, converter 800 includes three parallel DC/AC converters 605 coupled to the DC link 220. For clarity, FIG. 8 illustrates that the PWM control signals for only the topmost converter 605, however it is understood that the middle and bottom converters 605 also receive respective PWM control signals for the three phases. As shown, the Phase 1 PWM control signal and its inverse are received at a first pair of power switches, the Phase 2 PWM control signal and its inverse are received at a second pair of power switches, and the Phase 3 PWM control signal and its inverse are received at a third pair of power switches in the topmost DC/AC converter 605. Each of the pair of power switches generates a respective output that corresponds to one of the phases in the power signal. As discussed above, when performing interleaved switching, the Phase 1 PWM control signal received by the topmost converter 605 is phase shifted relative to the Phase 1 PWM control signals received by the middle and bottom converters 605. The same phase shifts may also be used for the Phase 2 and Phase 3 PWM control signals.

Unlike in FIG. 6 where the outputs for the three phases of one of the converters 605 are connected to the same grid choke, here, the outputs of each of the converters 605 are connected to three different chokes 810. More specifically, the phase 1 outputs of the converters 605 are transmitted to grid choke 810A, the phase 2 outputs are transmitted to grid choke 810B, and the phase 3 outputs are transmitted to grid choke 810C. Thus, in this embodiment, grid choke 810A receives all the phase 1 outputs from the three converters 605, grid choke 810B receives all the phase 2 outputs, and grid choke 810C receives all the phase 3 outputs. Moreover, instead of combining the outputs of the chokes 610 shown in FIG. 6 with the outputs of the other chokes 610, in FIG. 8, each choke 810 outputs a voltage corresponding to one of the phases. That is, the output of choke 810A corresponds to the first phase of the power signal, the output of choke 810B corresponds to the second phase, and so forth. As will be discussed below, connecting the outputs of the parallel converter paths as shown in FIG. 8 permits the grid chokes 810 to reduce the common mode current flowing between the DC/AC converters 605 in the parallel paths.

Figure 9A:
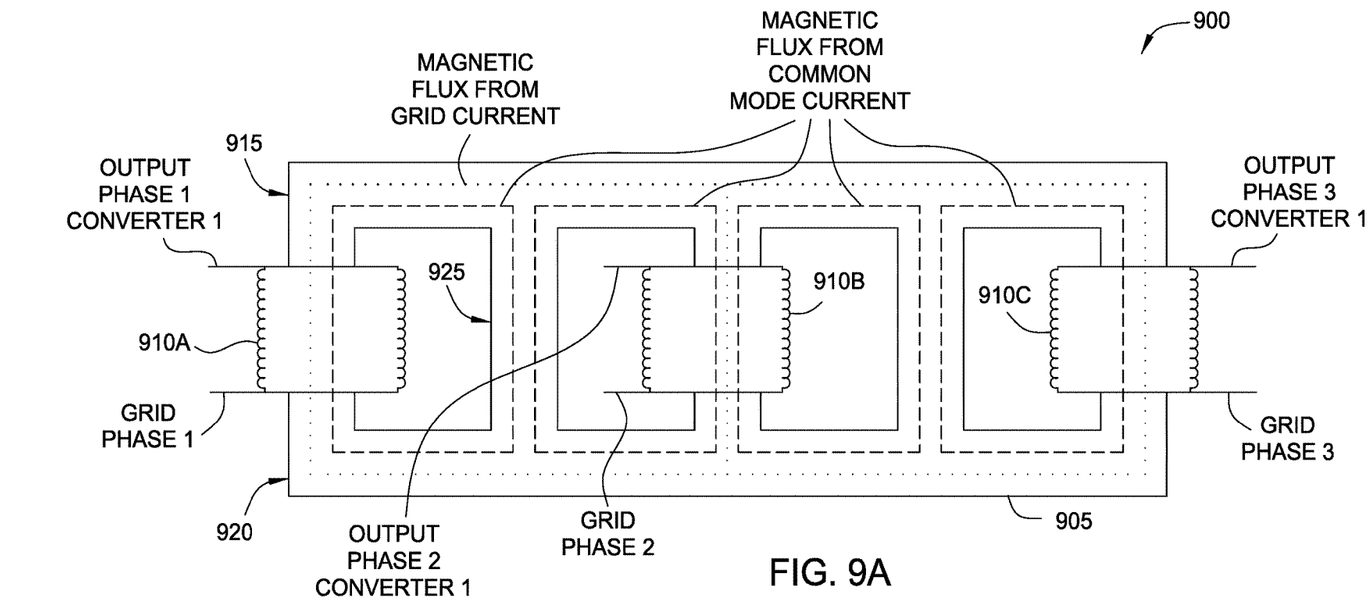
FIGS. 9A and 9B illustrate a grid choke for one of the converters illustrated in FIG. 6, according to one embodiment described herein.
Figure 9B:
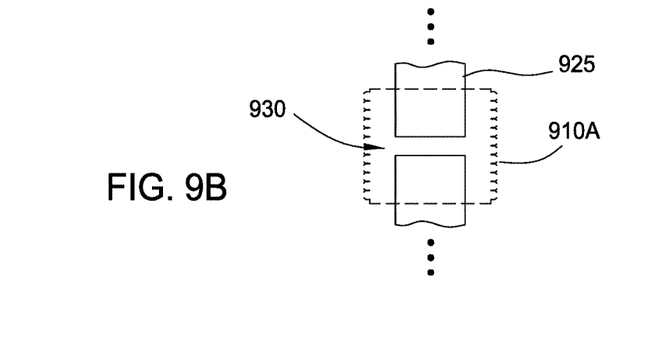

FIGS. 9A and 9B illustrate a grid choke 900 for one of the converters illustrated in FIG. 6, according to one embodiment described herein. In this example, the inputs of choke 900 are coupled to the three outputs of Converter 1. To do so, choke 900 includes three windings 910 where a first end of the winding 910 is coupled to one of the outputs of the Converter and a second end of the winding 910 provides one of the phases of the grid power signal. In winding 910A, the first end couples to the output corresponding to phase 1 and the second end couples to the first phase of the grid signal. In winding 910B, the first end couples to the output corresponding to phase 2 and the second end couples to the second phase of the grid power signal. In winding 910C, the first end couples to the output corresponding to phase 3 and the second end couples to the third phase of the grid power signal. Referring to FIG. 6, each of the converters 605 may be coupled to a respective choke using the arrangement shown in FIG. 9.

The choke 900 includes a core 905 that extends between, and through, the windings 910. In one embodiment, the core 905 includes a ferromagnetic material such as laminated/silicon steel, amorphous steel, iron power, and the like. The core 905 includes a top portion 915 and a bottom portion 920 that extend in a common direction and a plurality of center legs 925 extending between the two portions 915, 920. Three of the center legs 925 extend through apertures created by the windings 910, while two of the center legs 925 do not pass through any of the windings 910.

In operation, the grid current (i.e., the current flowing from the converters to the grid) and the common mode current (i.e., the current flowing between at least two of the converters through the chokes) generate two different magnetic flux paths in the choke 900. The magnetic flux from the grid current is represented in FIG. 9A as the dotted path while the magnetic flux from the common mode current is represented by the slashed path. The dotted path includes the top and bottom portions 915, 920 of the core 905 as well as the center legs 925 that extend through the windings 910 but does not include the center legs 925 which do not extend through the windings 910. In contrast, the common mode current generates magnetic flux paths that include the center legs 925 that extend through the winding and ones that do not. As such, the dashed lines illustrate four different magnetic flux paths generated by the common mode current.

The choke 900 may serve as a frequency block to remove or mitigate the high-frequency signals (e.g., the high-frequency ripple) from the outputs of the converters 605 resulting from performing PWM. One advantage of using interleaved PWM switching is that this reduces the high-frequency ripple, and thus, reduces the size and complexity of the chokes 900 that remove the ripple from the three-phases of the power signal. However, as discussed above, interleaved switching reduces the ripple but also introduces (or increases) the common mode current.

One technique for reducing the common mode current in the power generation system is to increase the inductance in the choke corresponding to the common mode current. Generally, as the inductance in the choke for the common mode current increases, the greater the impedance seen by the common mode current, thereby decreasing the common mode current flowing through the windings 910. In one example, the inductance of the common mode current can be changed by changing an air gap in the core 905. FIG. 9B illustrates one of the center legs 925 that extends through a winding 910 which is outlined using ghosted lines to permit the underlying structure of the center leg 925 to be seen. The center leg 925 includes an air gap 930 which separates the center leg 925 into upper and lower portions. Although the air gap 930 may be an atmospheric spacing between the upper and lower portions, in other embodiments, the gap 930 may be filled with an insulative, non-magnetic material.

Generally, as the air gap 930 decreases (i.e., the upper and lower portions of the leg 925 are separated by smaller distances), the gap 930 increases the inductance of the currents generating the magnetic flux path that extends across the gap 930. That is, if the magnetic flux path caused by the common mode current extends across air gap 930, the inductance of the common mode current is affected by the air gap 930. However, if the magnetic flux path of the common mode current does not include the gap 930, then the inductance of the common mode current is not affected by the gap 930.

As shown in FIG. 9A, both the magnetic flux path due to the grid current and the magnetic flux path due to the common mode current include (i) the top portion 915, (ii) the bottom portion 920, and (iii) the center legs 925 that extend through the windings 910. Thus, if any air gaps 930 are placed in these regions of the core 905, then the inductance of both the grid and common mode currents are affected. Because the magnetic flux paths of both of these currents include the center leg 925 in FIG. 9B, the respective inductances of the grid and common mode currents are changed as the air gap 930 is changed. For example, if the width of the air gap 930 is decreased such that the inductance of the grid current is increased by 10%, then the inductance of the common mode current is also increased by 10%. If the air gap 930 is then decreased further, the inductances for both currents would then increase by the same percentage.

In one embodiment, it may be desired to set a different inductance for the common mode current than the grid current. For example, it may be desired that the inductance corresponding to the grid current is lower than the inductance corresponding to the common mode current. Doing so may prevent the magnetic flux generated by the grid current from saturating the core while simultaneously reducing the common mode current flowing through the choke. As shown in FIG. 9A, adjusting the air gap in the top portion 915, bottom portion 920, or the center legs 925 extending through the windings 910 changes both the inductance of the grid current and the inductance of the common mode current in the same manner. Air gaps could also be added to the center legs 925 that do not extend through the windings 910, but as discussed above, increasing the air gap reduces the inductance of corresponding current. Thus, adding an air gap 930 to these center legs 925 would decrease the inductance of the common mode current since its magnetic flux path include these legs 925, but would not affect the inductance of the grid current.

The total inductance of the common mode current is affected by the air gaps in the top and bottom portions 915, 920, as well as any air gaps in the center legs 925. Thus, the total inductance of the common mode current is equal to or less than the total inductance of the grid current. Stated differently, because the magnetic flux path generated by the grid current includes the same portions of the core 905 as the magnetic flux paths generated by the common mode current, choke 900 does not provide a way for increasing the inductance of the common mode current without simultaneously increasing the inductance of the grid current. Thus, the inductance of the common mode current cannot be changed to a value that is greater than the inductance of the grid current.

Figure 10A:
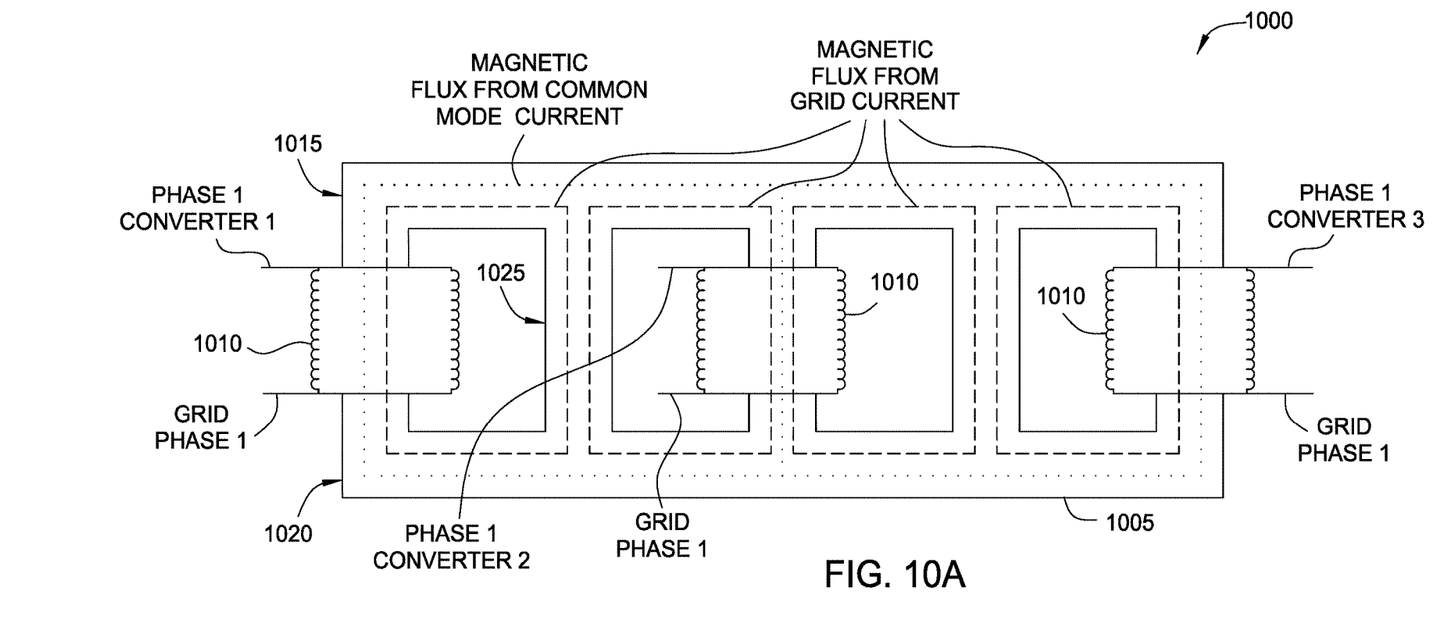
FIGS. 10A and 10B illustrate a grid choke for one of the converters illustrated in FIG. 8, according to one embodiment described herein.
Figure 10B:
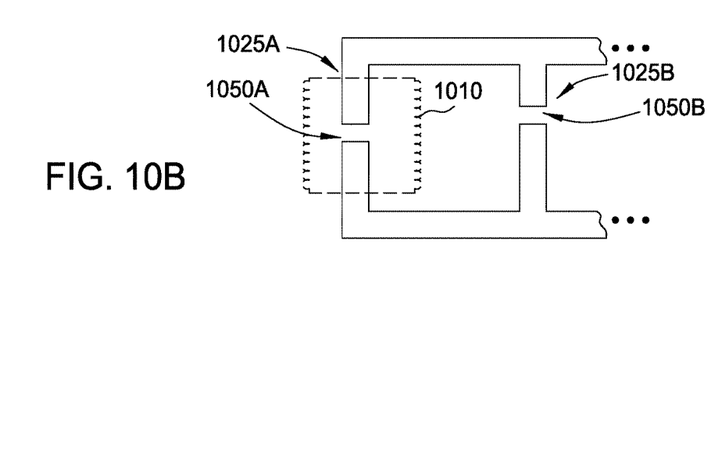

FIGS. 10A and 10B illustrate a grid choke 1000 for one of the converters illustrated in FIG. 8, according to one embodiment described herein. Generally, choke 1000 is arranged to provide a total inductance of the common mode current that is greater than the total inductance of the grid current. Like choke 900, choke 1000 includes three windings 1010 and a core 1005. The windings 1010 are arranged on the core 1005 in a similar manner as the windings 910 shown in FIG. 9A. However, unlike in FIG. 9A, the electrical connection between the windings 1010 and the DC/AC converters is different. Instead of coupling the windings to the respective phases output from a single converter, here, first ends of the windings 1010 are coupled to the outputs of phase 1 from the three converters. That is, the leftmost winding 1010 couples to the output of phase 1 from Converter 1, the middle winding 1010 couples to the output of phase 1 from Converter 2, and the rightmost winding 1010 couples to the output of phase 1 from Converter 3. Second ends of the windings 1010 may be attached to a shared electrical node to output the first phase of the grid signal. Of course, this technique of coupling the one of the phases of a plurality of converters may extend to any number of converters by adding or removing windings. The power generation system may include two other chokes 1000 for outputting the second and third phases of the grid signal. Thus, in the manner, the three converters have one output that is connected to each of the chokes 1000 rather than having all three outputs connecting to the same choke.

By connecting the choke 1000 in this manner, the magnetic flux paths of the grid and common mode currents are reversed relative to the flux paths illustrated in FIG. 9A. That is, the magnetic flux path generated by the common mode current includes a top portion 1015 of the core 1005, a bottom portion 1020 of the core 1005, and center legs 1025 that extend through the windings 1010. The magnetic flux path generated by the grid current includes, however, top portion 1015, bottom portion 1020, and all the center legs 1025—i.e., the legs 1025 that do, as well as those that do not, extend through the windings 1010.

FIG. 10B illustrates a portion of the choke 1000 that includes one center leg 1025A that extends through a winding 1010 (which is shown using ghosted lines) and an adjacent center leg 1025B that does not extend through a winding 1010. Both of the center legs 1025A and 1025B include respective air gaps 1050 that separate the center legs 1025 into top and bottom portions. As discussed above, the air gaps 1050 may be an atmospheric spacing or be filled with a non-magnetic material.

Generally, as the spacing of the air gaps 1050 increases, the inductance of the corresponding currents decreases, and vice versa. Thus, for any current in the windings 1010 that generates a magnetic flux path that runs through the air gaps 1050, the inductance of that current is affected by the air gaps 1050. Referring back to FIG. 10A, the magnetic flux paths generated by the grid current and the common mode current both include the center legs 1025 that extend through the windings 1010. As such, the air gap 1050A in leg 1025A affects the inductance of both the grid current and the common mode current. However, the magnetic flux path generated by the grid current also includes the center legs 1025 that do not extend through the windings 1010 but the magnetic flux path generated by the common mode current does not. Thus, the air gap 1050B in leg 1025B affects the inductance of the grid current but does not affect the inductance of the common mode current.

By adjusting the air gaps 1050, different inductance values can be assigned to the grid and common mode currents. For example, the air gaps 1050 can ensure the inductance of the common mode current is greater than the inductance of the grid current. In one embodiment, air gap 1050A has a smaller width separating the upper and lower portions of center leg 1025A than the width of air gap 1050B that separates the upper and lower portions of center leg 1025B. Assuming no other air gaps in the choke 1000, the inductance of the common mode current is set by the air gap 1050A while the inductance of the grid current is set by the combination of air gaps 1050A and 1050B. Because the inductance increases as the total air gap in the magnetic flux path decreases, the common mode current has a greater inductance than the grid current. Thus, using the arrangements shown in FIGS. 10A and 10B, the air gaps 1050 may be used to select an inductance of the common mode current that is greater than the inductance of the grid current.

In one embodiment, to select the value of the air gaps, the wind turbine operator calculates the total air gap needed in the choke 1000 to prevent the magnetic flux generated by the grid current from saturating the core (e.g., 40 mm). The operator then determines how to divide this total air gap between the center legs 1025A and 1025B since the magnetic flux path of the grid current includes both of these legs 1025. For example, the operator may want the inductance of the common mode current to be approximately ten times greater than the inductance of the grid current. As such, the operator may set the width of air gap 1050A to 4 mm and the width of air gap 1050B to 36 mm. Thus, the total air gap 1050 affecting the common mode current is only 4 mm but the total air gap 1050 affecting the grid current is 40 mm. Although FIG. 10B uses only two air gaps 1050, the total air gap may be spread out across any number of the legs and can even include air gaps on other portions of the core 1005 such as the top and bottom portions. For example, instead of placing air gap 1050A within the portion of the center leg 1025A enclosed by winding 1010, in other embodiments, the air gap 1050A may be located on a portion of the leg 1025A not enclosed by the winding 1010 or on the top and bottom portions 1015, 1020 of the core 1005 since the magnetic flux paths of both the grid and common mode currents also include these areas of the choke 1000.

In one embodiment, instead of using air gaps, the same effect may be achieved by using material with lower magnetic permeability than the material of the core. That is, by placing the lower permeability material in the paths of the magnetic flux as described above, the choke 1000 can generate a greater inductance for the common mode current than the grid current. For example, a larger portion of the lower permeability material may be placed in the center leg 1025B than in the center leg 1025A. Thus, the core 1005 may include any inductance control element (e.g., lower permeability material or an air gap) that reduces the effective permeability and is arranged as described above in order to selectively provide a different inductance for the common mode current than the grid current.

Additionally, the core may include a different magnetic material for the magnetic flux paths generated by the common mode and grid currents. The flux generated by the common mode current has a higher frequency and introduces high loss. Thus, having a low loss (but expensive) material in the path of the magnetic flux generated by the common mode current and a higher loss (but lower cost) material in the part of the core 1005 only traversed by the magnetic flux of the grid current (e.g., center leg 1025B).

Figure 11A:
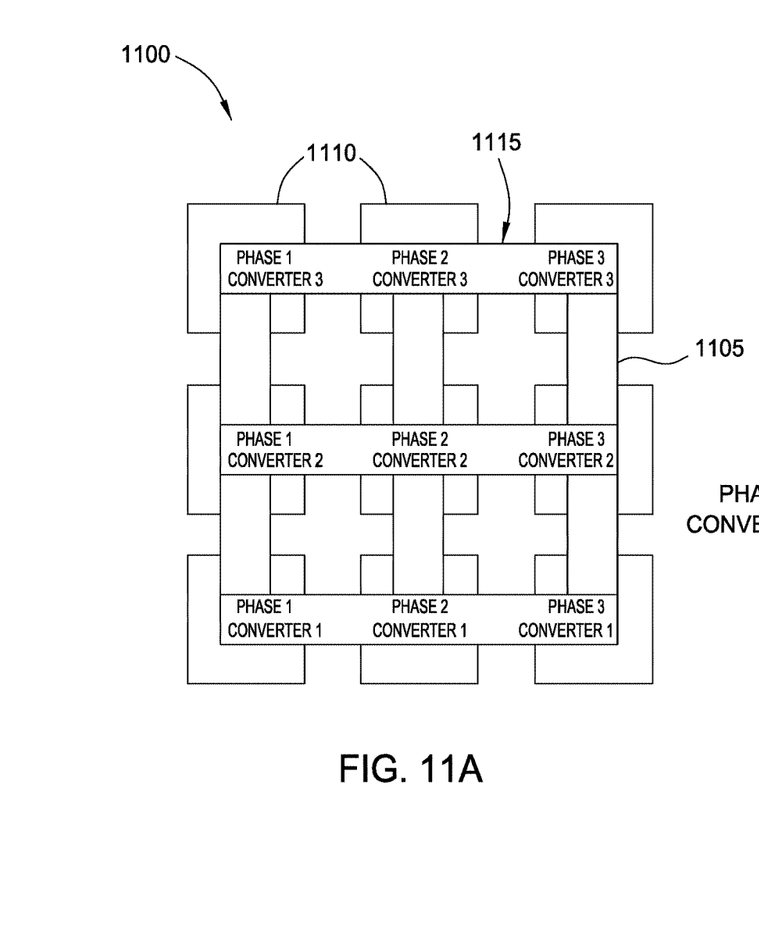
FIGS. 11A-11C illustrate an integrated grid choke for three converters outputting three phases, according to one embodiment described herein.
Figure 11B:
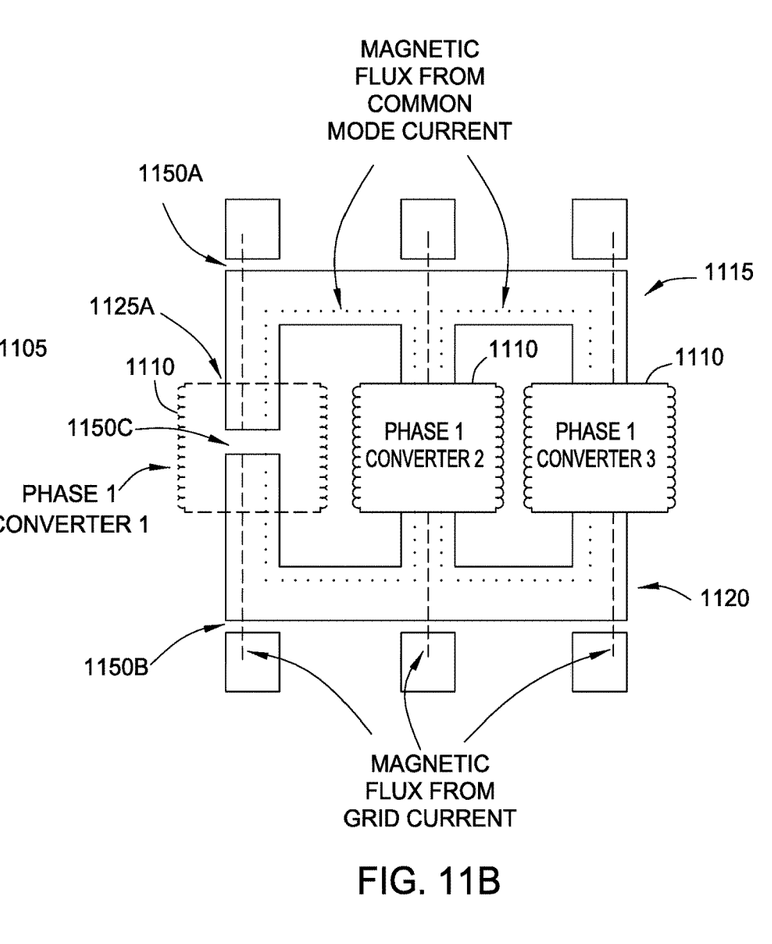
Figure 11C:
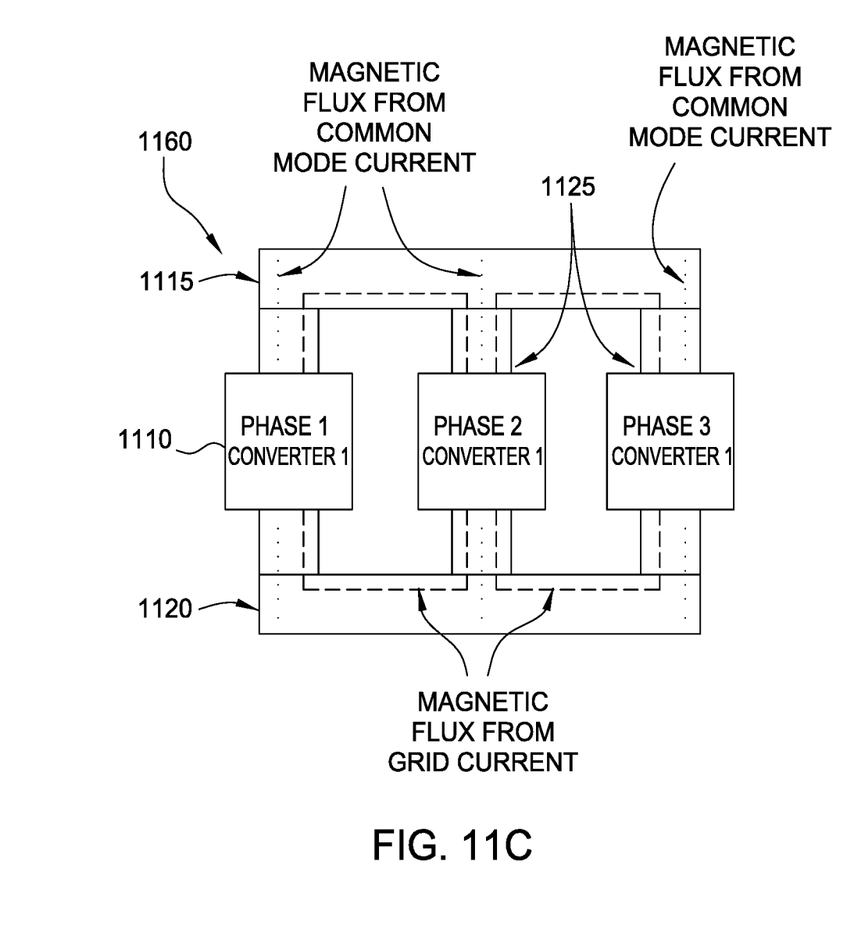

FIGS. 11A-11C illustrate an integrated grid choke 1100 for three converters outputting three phases. Here, unlike in FIG. 10A where a separate grid choke may be used for each of the respective phases, choke 1100 includes windings 1110 with first ends that respectively couple to three converters and to each of the three phases outputted by the three converters. In the top view of the choke 1100 shown in FIG. 11A, the three topmost windings 1110 couple to the three outputs of Converter 3, the three windings 1110 in the middle row couple to the three outputs of Converter 2, and the three bottommost windings 1110 couple to the three outputs of Converter 1. The second ends of the windings 1110 that correspond to the same phase may then be attached to a common electrical node to provide one of the phases of the power signal. For example, the seconds ends of the three leftmost windings 1110 form Phase 1 of the power signal, the second ends of the three windings 1110 in the middle column form Phase 2 of the power signal, and so forth.

Like in choke 1000 shown in FIG. 10A, choke 1100 also permits the power generation system to reduce the common mode current flowing between the converters. For example, choke 1100 provides two different paths for the flux of the grid and common mode currents so that it is possible to adjust the air gaps (or other inductance control elements) in each path to achieve higher inductance for the common mode current than the grid current and reduce the common mode current flowing between the converters.

FIG. 11B illustrates a side view of choke 1100 illustrated in FIG. 11A facing the windings 1110 for Phase 1 of Converter 1, Phase 1 of Converter 2, and Phase 1 of Converter 3. As shown, the choke 1100 includes a top portion 1115 and a bottom portion 1120 that extend in a common direction. Furthermore, choke 1100 includes center legs 1125 extending between the top and bottom portions 1115, 1120. The top and bottom portions 1115, 1120 form respective grids that interconnect the center legs 1125. However, unlike choke 1000, each of the center legs 1125 extend through a respective winding 1110. That is, in this embodiment, choke 1100 does not include any center legs 1125 that do not extend through a winding 1110.

As mentioned above, choke 1100 includes different magnetic flux paths for the grid and common mode currents. In FIG. 11B, the dashed lines represent a portion of the flux path generated by the grid current while the dotted lines represent a portion of the flux path generated by the common mode current. The magnetic flux path of the grid current extends in a vertical direction between the top and bottom portions 1115, 1120. Although not shown in this side view, the magnetic flux path from the grid current also extends into the page at the upper and bottom extremes of the vertical slashed lines which is shown in more detail in FIG. 11C below.

The magnetic flux path of the common mode current, in contrast, generates closed loops between the different windings 1110 of Phase 1. These loops extend through the center legs 1125 of each winding 1110 shown in FIG. 11B as well as the parts of the top and bottom portions 1115, 1120 that extend between the center legs 125. Although the magnetic flux paths are different, the flux paths for the grid and common mode currents both flow through the center legs 1125. Thus, any inductance control element in the center legs 1125 (e.g., air gap 1150C) affects the inductance of both the grid current and the common mode current. In contrast, any inductance control element in the flux path of the grid current, but not in the flux path of the common mode current (e.g., air gaps 1150A and 1150B), affects the inductance of the grid current but not the common mode current. By controlling the separation of the air gaps 1150A and/or 1150B as discussed above (e.g., increasing the width of the air gaps 1150A and/or 1150B), adjusts the inductance of the grid current without affecting the inductance of the common mode current. A converter designer can use air gap 1150C (or the combination of other air gaps in the center legs 125) to set the desired inductance for the common mode current which also changes the inductance of the grid current. However, by adding or adjusting the air gaps 1150A or 1150B, the designer can decrease the inductance of the grid current to its desired inductance while not affecting the inductance of the common mode current.

The example locations shown in FIG. 11B for the inductance control elements are intended as non-limiting examples that may be used to provide a greater inductance for the common mode current than the grid current. In other aspects, the inductance of the common mode current may be set by adding/increasing inductance control elements in the parts of the top and bottom portions 1115 and 1120 that are not within the flux path generated by the grid current. Using these control elements, the inductance of the common mode current may be set independently from the inductance of the grid current. As such, there are locations in the core 1105 where inductance control elements may be disposed to change the inductance of the common mode current but not the grid current (e.g. the part of the top portion 1115 or bottom portion 1120 that is between the center legs 1125). Alternatively, there are locations in the core 1105 where inductance control elements may be disposed to change the inductance of the grid current but not the common mode current (e.g., air gap 1150A). Moreover, although the air gaps 1150A and 1150B appear to separate the core 1105 using atmospheric spacing, in one embodiment, the gaps may be filled or supplemental structural members may be added to mechanically stabilize the core 1105.

FIG. 11O illustrates a side view 1160 of choke 1100 illustrated in FIG. 11A facing the windings 1110 for Phase 1, 2, and 3 of Converter 1. Specifically, the view 1160 is orthogonal to the view depicted in FIG. 11B. As such, the magnetic flux path of the grid current (e.g., the slashed line) generates closed loops that extend between the different windings 1110 for the three phases of Converter 1. The same is true of the windings 1110 for the three phases of Converter 2 and 3. In contrast, the magnetic flux path generated by the common mode current (i.e., the dotted lines) is shown as vertical lines extending from the top portion 1115 to the bottom portion 1120. However, as shown above in FIG. 11B, these paths also extend into the page to form closed loops between the windings 1110 of Phase 1 for Converters 1, 2, and 3. The same closed loops are formed by the magnetic flux path of the common mode current between the windings 1110 of the three outputs corresponding to Phase 2 and Phase 3.

Moreover, inductance control elements (which are not shown) may be used in FIG. 11C to selectively increase the inductance of the grid current. For example, inductance control elements may be placed in the parts of the top portion 1115 or the bottom portion 1120 that extend between the center legs 1125 and which do not include the magnetic flux path for the common mode current. These inductance control elements may be used in lieu of, or in combination with, the inductance control elements shown in FIG. 11B.

Moreover, the embodiments above indicated that some of the air gaps, or more generally, some of the inductance control elements, either do not affect the inductance of the common mode current or do not affect the inductance of the grid current. However, this statement does not mean that the inductance control element cannot have any effect on the inductance of these currents. For example, in operation, small amounts of the magnetic flux generated by the common mode current may traverse the air gap 1050B shown in FIG. 10B, thereby slightly changing inductance of the common mode current. However, whatever effect the air gap 1050B may have on the inductance of the common mode current is insignificant relative to the effect of the gap 1050B on the inductance of the grid current. Thus, stating that the air gap 1050B has no effect on the inductance of the common mode current means the air gap 1050B has substantially no effect on the inductance of the common mode current.

CONCLUSION

When performing interleaved PWM switching, a power generation system may include chokes for filtering out the high-frequency ripple from the desired AC signal. However, because the chokes are interconnected, a common mode current can flow between the different parallel converters via the chokes Instead of connecting all the outputs of one of the parallel converters to the same choke, the embodiments described herein connect one output from each of the parallel converters to the same choke. For example, assuming a three-phase power signal, instead of coupling the first, second, and third phase signals outputted by one of the parallel converters to the same choke, the first phase signals outputted by the parallel converters are sent to a first choke, the second phase signals outputted by the parallel converters are sent to a second choke, and the third phase signals outputted by the parallel converters are sent to a third choke. The outputs of the three chokes may then be interconnected. By attaching the chokes to converters in this manner, the air gaps in the chokes can be manipulated in order to provide a different inductance for the common mode current than a grid current (i.e., the current flowing from each of the converters to the load). In one embodiment, the air gaps are arranged such that the inductance corresponding to the common mode current is greater than the inductance corresponding to the grid current. In this manner, the chokes act as a current block to mitigate or reduce the common mode current flowing between the parallel converters.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

What is claimed is:

1. A power generation system, comprising:
   a generator configured to output a multi-phase power signal;
   a power converter system comprising a plurality of parallel converter paths, each converter path is coupled to the generator to receive the multi-phase power signal; and
   at least one electrical choke comprising a plurality of windings and a shared core that extends through each of the plurality of windings, wherein a first winding of the plurality of windings is coupled to a first output of a first path of the plurality of converter paths and a second winding of the plurality of windings is coupled to a first output of a second path of the plurality of converter paths, wherein the first output of the first path and the first output of the second path correspond to a same phase of the multi-phase power signal.

2. The power generation system of claim 1, further comprising:
   a second electrical choke coupled to a second output of the first path and a second output of the second path, wherein both the second output of the first path and the second output of the second path correspond to a different phase of the multi-phase power signal than the same phase.

3. The power generation system of claim 2, wherein the at least one electrical choke is configured to output a first phase of a power signal and the second electrical choke is configured to output a second phase of the power signal.

4. The power generation system of claim 1, wherein the multi-phase power signal comprises a three-phase power signal, wherein the same phase is a first phase of the three-phase power signal, and wherein the system further comprises:
   a second electrical choke coupled to each of the plurality of converter paths and configured to output a second phase of the three-phase power signal;
   a third electrical choke coupled to each of the plurality of converter paths and configured to output a third phase of the three-phase power signal.

5. The power generation system of claim 4, wherein the at least one electrical choke is configured to receive a first plurality of outputs from the plurality of converter paths that corresponds to only the first phase, the second electrical choke is configured to receive a second plurality of outputs from the plurality of converter paths that corresponds to only the second phase, and the third electrical choke is configured to receive a third plurality of outputs from each of the plurality of converter paths that corresponds to only the third phase.

6. The power generation system of claim 1, wherein the at least one electrical choke comprises a first air gap configured to affect an inductance of a grid current flowing through the at least one electrical choke from the power converter system to a load but not affect an inductance of a common mode current flowing between at least two of the plurality of parallel converter paths.

7. The power generation system of claim 6, wherein the at least one electrical choke comprises a second air gap configured to affect both the inductance of the grid current and the inductance of the common mode current.

8. The power generation system of claim 1, wherein a third winding of the plurality of windings is coupled to a second output of the first path and a fourth winding of the plurality of windings is coupled to a second output of the second path, wherein the second output of the first path and the second output of the second path correspond to different phases of the multi-phase power signal.

9. A wind turbine, comprising:
a generator configured to output a multi-phase power signal;
a power converter system comprising a plurality of parallel converter paths, each converter path is coupled to the generator to receive the multi-phase power signal; and
at least one electrical choke comprising a plurality of windings and a shared core that extends through each of the plurality of windings, wherein a first winding of the plurality of windings is coupled to a first output of a first path of the plurality of converter paths and a second winding of the plurality of windings is coupled to a first output of a second path of the plurality of converter paths, wherein the first output of the first path and the first output of the second path correspond to a same phase of the multi-phase power signal.

10. The wind turbine of claim 9, wherein the at least one electrical choke comprises a first air gap configured to affect an inductance of a grid current flowing through the at least one electrical choke from the power converter system to a load but not affect an inductance of a common mode current flowing between at least two of the plurality of parallel converter paths.

11. A power generation system, comprising:
a generator configured to output a multi-phase power signal;
a power converter system comprising a plurality of parallel converter paths, each converter path is coupled to the generator to receive the multi-phase power signal; and
at least one electrical choke comprising a plurality of windings, wherein a first winding of the plurality of windings is coupled to a first output of a first path of the plurality of converter paths and a second winding of the plurality of windings is coupled to a first output of a second path of the plurality of converter paths, wherein the first output of the first path and the first output of the second path correspond to a same phase of the multi-phase power signal,
wherein the at least one electrical choke comprises a first air gap configured to affect an inductance of a grid current flowing through the at least one electrical choke from the power converter system to a load but not affect an inductance of a common mode current flowing between at least two of the plurality of parallel converter paths.

12. The power generation system of claim 11, wherein the at least one electrical choke comprises a second air gap configured to affect both the inductance of the grid current and the inductance of the common mode current.

13. The power generation system of claim 11, further comprising:
a second electrical choke coupled to a second output of the first path and a second output of the second path, wherein both the second output of the first path and the second output of the second path correspond to a different phase of the multi-phase power signal than the same phase.

14. The power generation system of claim 13, wherein the at least one electrical choke is configured to output a first phase of a power signal and the second electrical choke is configured to output a second phase of the power signal.

15. The power generation system of claim 11, wherein the multi-phase power signal comprises a three-phase power signal, wherein the same phase is a first phase of the three-phase power signal, and wherein the system further comprises:
a second electrical choke coupled to each of the plurality of converter paths and configured to output a second phase of the three-phase power signal;
a third electrical choke coupled to each of the plurality of converter paths and configured to output a third phase of the three-phase power signal.

* * * * *